(12) United States Patent
Martin et al.

(10) Patent No.: US 8,005,472 B2
(45) Date of Patent: Aug. 23, 2011

(54) METHOD OF REPORTING POOR RF COVERAGE IN A WIRELESS NETWORK

(75) Inventors: Ronald Bruce Martin, Carol Stream, IL (US); Randall Joe Wilson, Duluth, GA (US)

(73) Assignee: Alcatel Lucent, Paris (FR)

( * ) Notice: Subject to any disclaimer, the term of this patent is extended or adjusted under 35 U.S.C. 154(b) by 727 days.

(21) Appl. No.: 12/002,920

(22) Filed: Dec. 19, 2007

(65) Prior Publication Data
US 2009/0163197 A1    Jun. 25, 2009

(51) Int. Cl.
*H04W 24/00* (2009.01)
(52) U.S. Cl. ....... 455/423; 455/3.01; 455/456; 455/41.2
(58) Field of Classification Search ................. 455/3.01, 455/456, 41.2
See application file for complete search history.

(56) References Cited

U.S. PATENT DOCUMENTS

| | | | |
|---|---|---|---|
| 5,771,274 A * | 6/1998 | Harris | 379/22.03 |
| 2002/0098851 A1 * | 7/2002 | Walczak et al. | 455/456 |
| 2004/0214521 A1 * | 10/2004 | Tsunehara et al. | 455/3.01 |
| 2005/0048917 A1 * | 3/2005 | Weng | 455/41.2 |

* cited by examiner

*Primary Examiner* — Charles Shedrick
(74) *Attorney, Agent, or Firm* — John B. MacIntyre

(57) ABSTRACT

The present invention provides a method for storing data relating to network conditions in a mobile unit. A mobile station receives a signal from a base station. The mobile station stores data associated with the signal in memory within the mobile unit. When the mobile unit determines that the signal has been dropped, the mobile unit freezes the memory until it can transmit the data to a network outage data center. This helps the system diagnose and correct transient service outages.

6 Claims, 4 Drawing Sheets

| Location | Signal Strength | Handoff Status | Frequency in Use | Control Channel Traffic | Cell Site ID |
|---|---|---|---|---|---|
| | | | | | |
| | | | | | |
| | | | | | |
| | | | | | |
| | | | | | |
| | | | | | |
| | | | | | |

391 — Location
392 — Signal Strength
393 — Handoff Status
394 — Frequency in Use
395 — Control Channel Traffic
396 — Cell Site ID 300, 310, 320, 330, 340, 350, 360, 370

METHOD OF REPORTING POOR RF COVERAGE IN A WIRELESS NETWORK

FIELD OF THE INVENTION

The present invention relates generally to wireless communication systems, and more particularly to network performance in wireless communication systems.

BACKGROUND OF THE INVENTION

In wireless communication systems, signals are sent over the air between base stations and mobile units. Each base station typically has an associated coverage area. The base station should be able to transmit and receive signals with any mobile unit that is within its coverage area.

There are times when a mobile unit is unable to receive signals from a base station that it is normally able to receive. These transient outage locations are difficult to diagnose since they occur sporadically. Even if service personnel are dispatched to the transient outage location, since the problem is sporadic data relating to the transient outage can be difficult to obtain.

These transient outage situations can be caused by numerous factors. For example, a transient outage situation can be caused by environmental factors, such as atmospheric conditions or weather. Transient outage situations can also be caused by temporary interference with other base stations, temporary hardware problems within the wireless communication system, or a variety of other factors.

Transient outage situations cause service disruptions to mobile units engaged in calls within the wireless communication system. Service disruption leads to frustrated users and low customer satisfaction.

Therefore, a need exists for a method of reporting and diagnosing transient outage locations and poor RF coverage within wireless communication systems.

BRIEF SUMMARY OF THE INVENTION

The present invention provides a method for reporting a network outage situation, such as transient poor RF coverage, in a wireless communication system. A mobile unit receives a signal from a wireless communication system, typically from a base station within the wireless communication system. The mobile unit receives information from the signal and can determine various information about the signal. For example, the mobile unit receives data such as handoff status, the frequency being used, control channel information, the error rate of the bearer path, the number of retransmissions, and cell site identification from the signal. The mobile unit can also derive the signal strength from the received signal. In addition, the mobile unit can determine other information that is relevant to the time at which the signal was received, such as the current location of the mobile unit, preferably via a GPS receiver within the mobile unit.

In accordance with an exemplary embodiment, the mobile unit stores data related to the signal. The memory is preferably a "rolling" memory that is continuously recirculating such that when the end of the memory is reached, the mobile unit returns to the top of the memory and writes over the first data that was written into the memory.

The mobile unit determines if the signal has been dropped or is degraded. If the signal has not been dropped or the signal has not degraded beyond a predetermined threshold, the mobile unit continues to receive signals from the wireless communication system.

If the mobile unit determines that the signal has been dropped or is degraded, the mobile unit freezes the data located within the memory. The mobile unit ceases writing data to the memory until it has verified that it has successfully transferred the data to a network element such as the network data outage center. In addition, the mobile unit does not delete or write over the data in the memory until it has received an acknowledgement that the data has been properly received by the network data outage center.

BRIEF DESCRIPTION OF THE SEVERAL VIEWS OF THE DRAWINGS

FIG. 3 depicts memory for storing data within a mobile unit in accordance with an exemplary embodiment of the present invention.

DETAILED DESCRIPTION OF THE INVENTION

Figure 1:
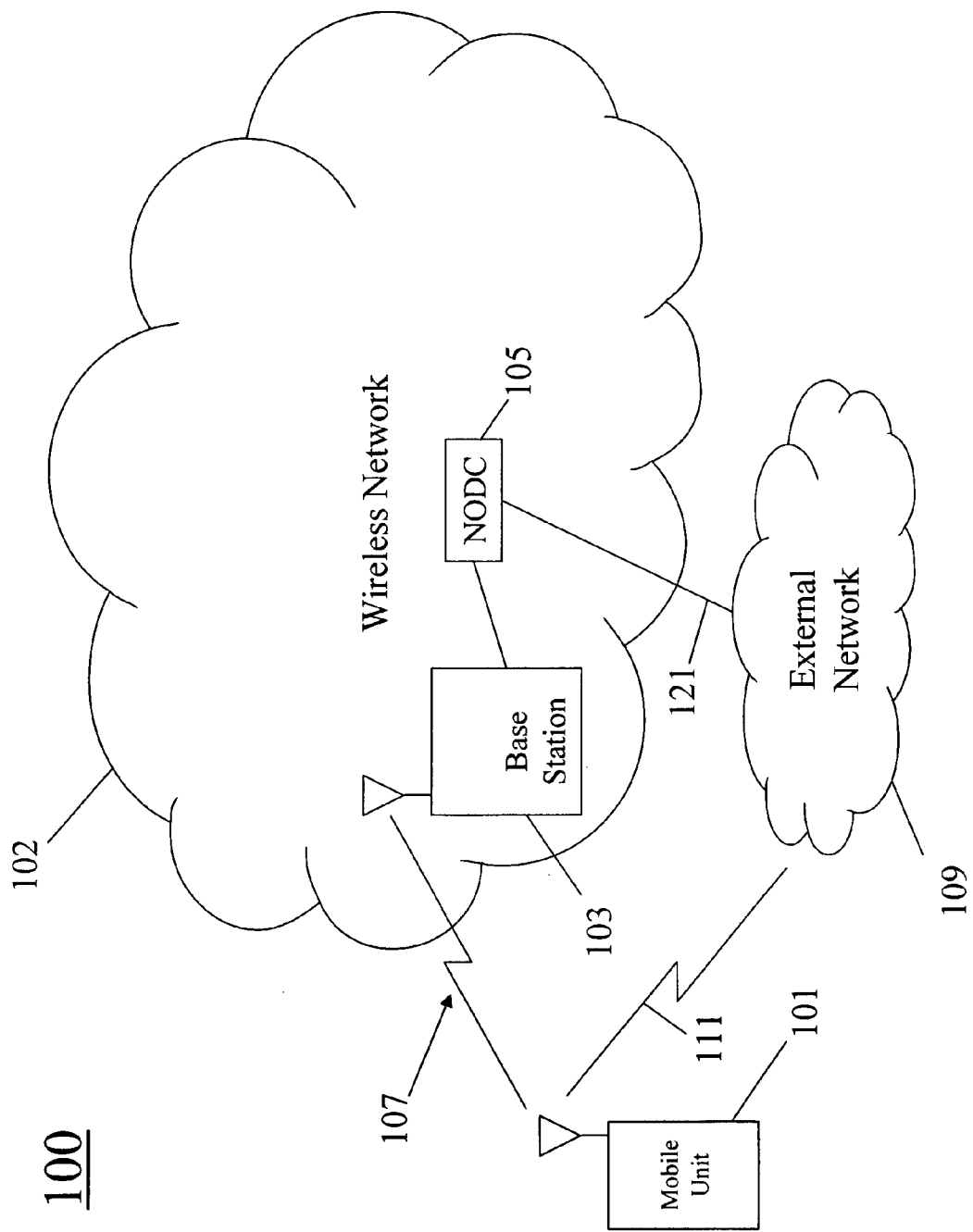
FIG. 1 depicts a wireless communication system in accordance with an exemplary embodiment of the present invention.

The present invention can be better understood with reference to FIGS. 1-4. FIG. 1 depicts wireless communication system 100 in accordance with an exemplary embodiment of the present invention. Wireless communication system 100 includes mobile unit 101, wireless network 102, and external network 109. Wireless network 102 includes base station 103 and network outage data center (NODC) 105. It should be understood that wireless communication system typically includes a plurality of mobile units and wireless network 102 preferably includes a plurality of base stations and also additional equipment, but only mobile unit 101, base station 103, NODC 105, and external network 109 are depicted in FIG. 1 for the sake of clarity.

Mobile unit 101 is preferably a wireless unit that is capable of use in wireless communication system 100. For example, mobile unit 101 can be a cellular phone, a pager, a wireless terminal, or any other wireless equipment that is capable of being used in a wireless system.

Wireless network 102 is a network that facilitates communication between mobile units and other mobile units or devices connected to networks that are connected to wireless network 102.

Base station 103 is a network element that provides over the air communication with mobile units and also communication with core network elements within wireless network 102. Wireless network 102 preferably includes a plurality of base stations.

NODC 105 is a network element that collects, stores, and preferably analyzes data that is related to network outage situations. NODC 105 is depicted as a separate element in FIG. 1. In this embodiment, NODC 105 is a server or the like that receives the outage data from mobile units that have encountered transient outage situations. NODC 105 can alternately be located outside of wireless network 102. In this embodiment, NODC 105 receives the network outage data from mobile unit 102 via an alternate means, such as via external network 109. External network 109 can also provide the network outage data to NODC 105 when NODC 105 is located within wireless network 102. In a further exemplary embodiment, NODC 105 can be a function within another network element, such as within a Mobile Switching Center (MSC) or any other network element.

Signal 107 is an over the air signal that is transmitted between mobile unit 101 and base station 103. This signal, if not received properly by mobile unit 101, indicates that mobile unit 101 is within a transient outage location, since it is expecting to receive a proper signal. A transient outage location is a location that can, at times, receive signals properly but during certain times or under certain circumstances a signal in that location is not properly received.

External network 109 is a network that is preferably coupled to mobile unit 101 via wireless link 111. External network can alternately be accessed by mobile unit 101 through the internet via a web server acting as NODC 105. External network is coupled to wireless network 102 via link 121. Link 121 carries the data from mobile unit 101 to NODC 105 via external network 109.

Figure 2:
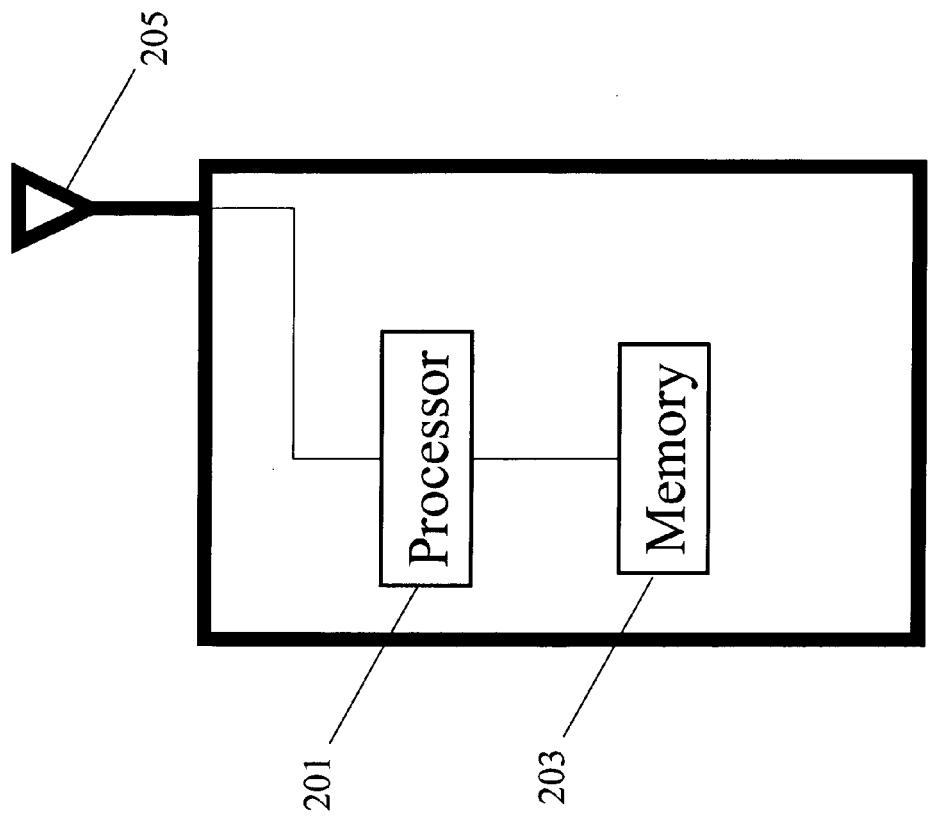
FIG. 2 depicts a mobile unit including memory for storing network outage data in accordance with an exemplary embodiment of the present invention.

FIG. 2 depicts mobile unit 101 including memory 203 for storing network outage data in accordance with an exemplary embodiment of the present invention.

Mobile unit 101 preferably includes a processor 201, a memory 203, and an antenna 205. It should be understood that mobile unit 101 typically includes additional elements, such as a keypad, a display, a microphone, and a speaker, but only elements 201, 203, and 205 are depicted for the sake of clarity.

In accordance with an exemplary embodiment of the present invention, antenna 205 receives signals from base station(s) located within a wireless communication system. The signals are processed by processor 201. In an exemplary embodiment, processor 201 derives and determines which data should be written to memory 203 and controls the process by which memory 203 is instructed to store the data.

Memory 203 stores the data. In an exemplary embodiment, memory 203 is RAM that stores data within a linked list or other similar data structure. Memory 203 can be any suitable memory for such purposes, such as FLASH memory.

FIG. 3 depicts memory 203 for storing data within a mobile unit in accordance with an exemplary embodiment of the present invention. Memory 203 comprises a plurality of records 300, 310, 320, 330, 340, 350, 360, and 370. It should be understood that memory 203 could include any number of records, but eight have been shown in FIG. 3 for the sake of clarity.

Each record includes a plurality of fields. As indicated in FIG. 3, each record includes a location field 391, a signal strength field 392, a handoff status field 393, a frequency in use field 394, a control channel traffic field 395, and a cell site ID field 396.

In accordance with an exemplary embodiment, mobile station 101 stores data in memory 203 when mobile unit 101 registers with base station 103. Thereafter, mobile unit 101 records data in memory 203 at predetermined intervals, such as every 500 milliseconds. For example, when mobile unit 101 registers with base station 103, mobile unit 101 obtains a pointer to the next record in memory 203 and then writes data associated with the most recently received signal and derived data in that record. Mobile unit 101 thereafter records data in memory 203 at predetermined intervals.

Mobile station 101 writes the location in location field 391, the signal strength in signal strength field 392, the handoff status is handoff status field 393, the current frequency in frequency in use field 394, information derived from the control channel in control channel traffic field 395, and the cell site identification in cell site ID field 396. Mobile unit 101 then preferably advances the pointer to the next record so that it will be ready to write information related to the next received signal in the next record within memory 203.

Figure 4:
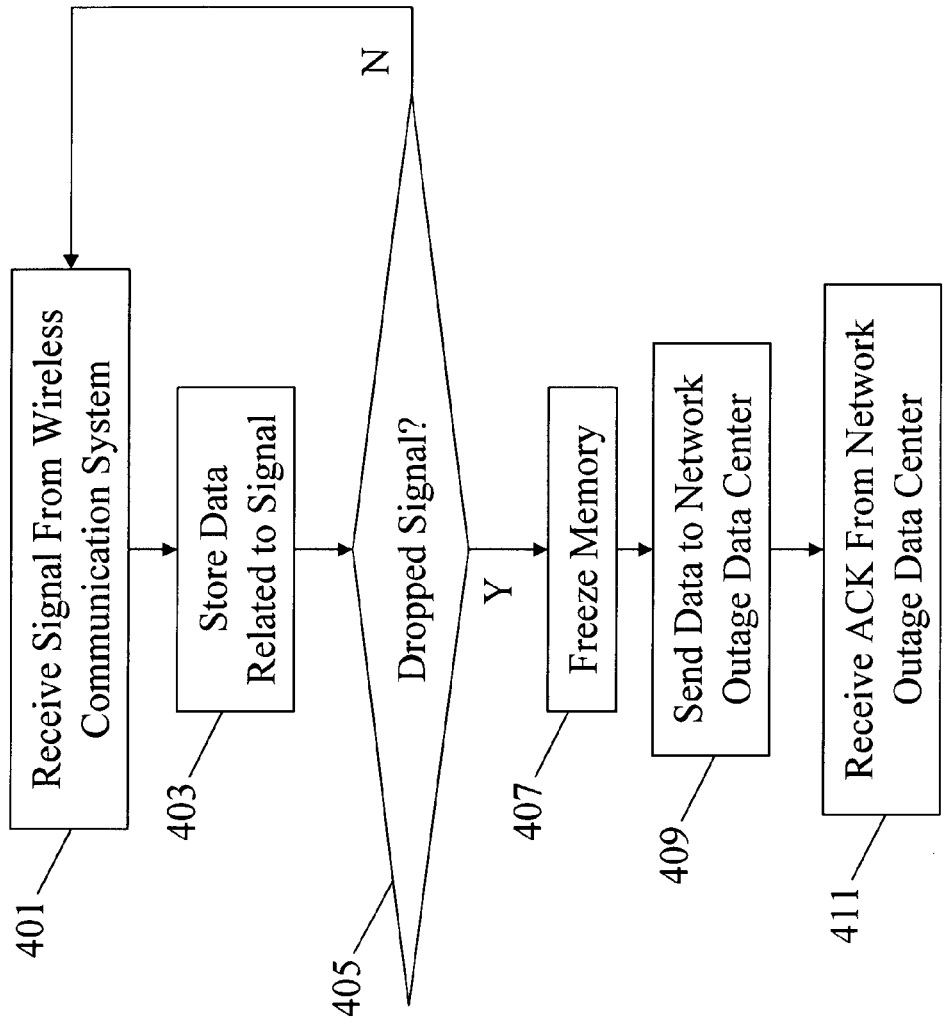
FIG. 4 depicts a flowchart of a method for reporting a network outage event in a wireless communication system in accordance with an exemplary embodiment of the present invention.

FIG. 4 depicts a flowchart 400 of a method for reporting a network outage event in wireless communication system 100 in accordance with an exemplary embodiment of the present invention.

A mobile unit receives (401) a signal from a wireless communication system. The signal is typically received from one of a plurality of base stations that are part of wireless communication system 100. The signal can include data comprising multiple factors. The mobile unit receives certain data from the signal received and can also determine characteristics of the signal. The mobile unit can also detect from the signal other information, such as the signal strength of the received signal.

In accordance with an exemplary embodiment of the present invention, the mobile unit stores (403) data related to the signal. The data is preferably stored in memory 203 depicted in FIG. 2. Examples of the data stored is shown in FIG. 3. As described below with reference to FIG. 2, memory 203 is a "rolling" memory that is continuously recirculating such that when the end of the memory is reached, the mobile unit returns to the top of the memory and writes over the first data that was written into memory 203.

The mobile unit determines (405) if the signal has been dropped. In an exemplary embodiment, the mobile unit determines that the signal has been dropped when it expects to receive a signal from a base station but fails to properly receive a signal. In an exemplary embodiment, a signal is considered to be dropped when the signal quality is lower than a predetermined threshold. A dropped signal is basically a signal that is impaired to such a level that its quality is lowered to a level that increases dropped calls or increases error rates. Dropped signals can be caused by environmental issues, such as weather, topographical issues, such as buildings or mountains, interference conditions, or various other reasons. In an exemplary embodiment, the mobile unit can track and transmit information relating to not only dropped or lost signals from a base station but also signals that have error rates above a predetermined threshold, a number of retransmissions above a predetermined threshold, and other factors that indicate poor end user service.

If the mobile unit determines that the signal has not been dropped and is above a quality threshold, it returns to step 401 to continue to receive signals from the wireless communication system.

If the mobile unit determines at step 405 that the signal has been dropped or has been sufficiently degraded, the mobile unit freezes (407) the data located within memory 203. As used herein, the term "freezes" refers to the process of maintaining data located within memory until a particular step has occurred, in this instance the transferring of the data to a network outage data center. In an exemplary embodiment of the present invention, the mobile unit ceases writing data to memory 203 until it has verified that it has successfully transferred the data to a network element such as the network data outage center.

In accordance with an exemplary embodiment of the present invention, the mobile unit sends (409) the data to a network outage data center. The data can be sent in any appropriate manner, such as over wireless network 102 when the NODC is located within the wireless network. Alternately, the data can be sent to the NODC in a manner similar to that when completing a call to a wireline station or to a web portal.

It is important that the mobile unit not delete or write over the data in memory 203 until it has received an acknowledgement that the data has been properly received. Therefore, in accordance with an exemplary embodiment, the mobile unit receives (411) an acknowledgement from the NODC. Upon receiving the ACK, the mobile unit preferably continues writing data into memory 203 from the point that it left off from memory 203 and returns to step 401 to receive a signal from the wireless communication system. It should be understood that the mobile unit can erase the data or can return to the beginning of memory 203 and write over the existing data located within memory 203.

While this invention has been described in terms of certain examples thereof, it is not intended that it be limited to the above description, but rather only to the extent set forth in the claims that follow.

We claim:

1. A method for storing data relating to network conditions in a mobile unit, the method comprising: receiving a signal from a base station; storing data associated with the signal in memory in the mobile unit; transmitting the data to a network outage data center; receiving an acknowledgment message from the network outage data center in response to the step of transmitting; erasing the data from the memory after receiving the acknowledgment message from the network outage data center and when the mobile unit determines that the signal has been dropped, freezing the memory.

2. A method for storing data relating to network conditions in accordance with claim 1, wherein the data stored is data contained within the signal.

3. A method for storing data relating to network conditions in accordance with claim 1, wherein the data stored is data related to the signal.

4. A method for storing data relating to network conditions in accordance with claim 1, the method further comprising the step of storing geographic information in the memory of the mobile unit.

5. A method for storing data relating to network conditions in accordance with claim 4, wherein the geographic information is correlated with the data associated with the signal.

6. A method for storing data relating to network conditions in accordance with claim 5, wherein the geographic information and the data associated with the signal are correlated by time.

* * * * *